United States Patent Office 2,846,405
Patented Aug. 5, 1958

2,846,405

COMPOSITION FOR AND METHOD OF INHIBITING CORROSION OF METALS

William B. Hughes, Webster Groves, Mo., assignor to Cities Service Research and Development Company, New York, N. Y., a corporation of New Jersey No Drawing. Application March 26, 1956
Serial No. 573,622

8 Claims. (Cl. 252—392)

This invention relates to inhibiting corrosion of metals, and more particularly relates to an improved composition and process for the prevention of corrosion in natural gas poduction, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas, as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

I have now discovered that corrosion of the type described above may be substantially inhibited by introducing into the production, collection and distribution lines as well as associated equipment including tanks a small but sufficient quantity of a reaction product obtained by first reacting dicyandiamide with a 1,2 diamine in substantially equimolar quantities to provide an intermediate imidazolidine-guanylimine product which is thereafter reacted with from 1 to 2 mols of ethylene oxide. This further reacting of the imidazolidine-guanylimine with the ethylene oxide provides oxyethylated imidazolidine-guanylimines which have unexpected and superior corrosion-inhibiting properties.

In preparing these new compounds, which I have found to be uniquely effective in reducing corrosion of the type described, I first prepare the imidazolidine-guanylimine by reacting 1 mol of the polyethyleneamine with 1 mol of dicyandiamide under conditions which effect the removal of 1 mol of ammonia from the reaction mixture. The removal of ammonia from the reaction mixture is accomplished by heating the mixture from a temperature of about 175° to about 250° C. The reaction mixture is maintained at this temperature for a period of from 1 to about 15 hours so as to bring about the formation of the imidazolidine ring. To obtain the oxyethylated imidazolidine-guanylimines, the intermediate reaction product described above is treated with ethylene oxide under conditions which permit the taking up of approximately 1 mol of ethylene oxide for each mol of the intermediate reaction product present. This final product is believed to be a new compound not previously known or described. The exact nature of the linkage between the ethylene oxide and the imidazolidine-guanylimine is not clearly known, though it is believed that the ethylene oxide attaches to the primary amine group of the side chain on the imidazolidine ring of the imidazolidine-guanylimine compound.

In preparing these new and effective corrosion-inhibiting compounds, the intermediate imidazolidine-guanylimine can be prepared by utilizing a polyethylene amine selected from the group comprising diethylene triamine, triethylene tetramine and tetraethylene pentamine. While I have found it convenient to add from 1 to 2 mols of ethylene oxide to the intermediate imidazolidine-guanylimine product, it is conceivable that more than 2 mols of ethylene oxide could be added, since the imidazolidine-guanylimine compound has available several positions at which the ethylene oxide molecule could be added. I have found, however, that the addition of more than 2 mols of ethylene oxide per mol of imidazolidine-guanylimine adversely affects the solubility of the final product.

The reaction by which the new and improved compounds of my invention are obtained may be represented as follows:

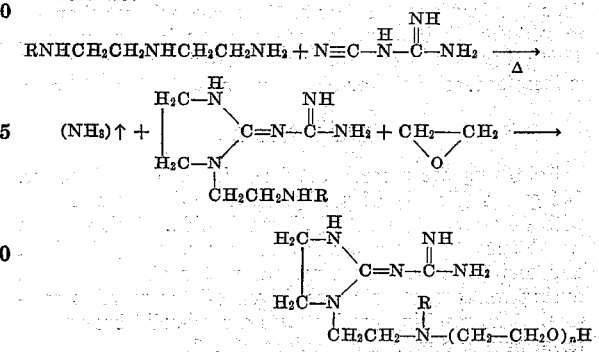

In the final reaction product, the oxyethylated substituted imidazolidine-guanylimine R represents H; $CH_2-CH_2-NH_2$; $-CH_2-CH_2-NH-CH_2-CH_2-NH_2$; or an alkyl group having from 1 to about 10 carbon atoms and n is a number from 1 to 2. The ethylene oxide is believed to react with the N atom of the ethylamino side chain of the imidazolidine-guanylimine in the manner and form shown.

In preparing the intermediate product, the polyethyleneamine and the dicyandiamide are mixed and heated to a temperature of about 200° C. for a period of from about 5 to 10 hours. Maintaining the reactants at this temperature for the period noted will effect removal of the 1 mol of ammonia and the formation of the imidazolidine ring.

In preparing the final reaction product, the intermediate product is dissolved in an inert solvent such as a low molecular weight aliphatic alcohol ether and the like, and treated with the ethylene oxide. The ethylene oxide is passed into the solution in gaseous form and will cause a slight rise in temperature indicating reaction with the imidazolidine-guanylimine intermediate product. The reaction of the ethylene oxide and the intermediate reaction product is carried out at atmospheric temperature and pressure. If desired, some heat may be used, however the temperature should not be increased above 75° C. The addition of the ethylene oxide under atmospheric conditions will generally take from 2-4 hours when molar quantities of reactants are used.

After addition of the ethylene oxide is completed, the inert solvent is removed from the final oxyethylated product by distillation.

In order to more fully understand the nature of the compounds of my invention, the manner in which they are prepared and the method by which they may be utilized in protecting metallic surfaces from corrosive action, the following specific examples are provided:

EXAMPLE 1

To 103 grams (1 mol) of diethylene triamine, 84 grams (1 mol) of dicyandiamide were added, the mixture was heated to a temperature of from about 190 to 200° C. and held at this temperature for 9 hours, during which ammonia was continuously removed from the reaction mixture. The resulting brown semi-solid product was found to be completely soluble in isopropyl alcohol and had a molecular weight of 168. The theoretical molecular weight for this reaction product is 170.

25 grams (0.142 mol) of the above intermediate imidazolidine-guanylimine compound was dissolved in 75 grams of isopropyl alcohol. Gaseous ethylene oxide was then slowly added to the solution until approximately 6.25 grams (0.142 mol) of ethylene oxide had been added to the imidazolidine-guanylimine product. During this addition a 12° C. rise was noted. When the addition of ethylene oxide was complete, the mixture was allowed to cool to room temperature. Completion of the oxyethylation reaction was indicated by no further spontaneous rise in temperature on addition of the ethylene oxide. This required about 3 hours. The alcohol was then removed by distillation, leaving a clear brown product. This compound was tested as a corrosion inhibitor, and is identified as Inhibitor No. 1 in Table 1 which follows.

EXAMPLE 2

Following the method set forth in Example 1 above, 146 grams (1 mol) of triethylene tetramine were reacted with 84 grams (1 mol) of dicyandiamide. This mixture was heated to a temperature of approximately 200° C. and maintained at this temperature for about 8 hours, during which ammonia was driven off the reaction mixture. The resulting product was a semi-solid brown material having a molecular weight of 213.

25 grams (0.123 mol) of the above product was then dissolved in 75 grams of isopropyl alcohol. Ethylene oxide was slowly bubbled into the alcohol solution until approximately 6 grams of ethylene oxide had been taken up by the reaction product of the diethylene triamine-dicyandiamide reaction. During the addition of the ethylene oxide a rise in temperature was noted. The ethylene oxide introduction required about 3 hours. At the end of this period the reaction mixture was allowed to cool, and the isopropyl alcohol solvent was removed by distillation. The final reaction product was brownish in color. This product, tested as a corrosion inhibitor, provided the protection indicated for Inhibitor No. 2 in Table 1.

EXAMPLE 3

According to the method described in Example 1 above, an intermediate imidiazolidine-guanylimine product was prepared by reacting 189 grams (1 mol) of tetraethylene pentamine with 84 grams (1 mol) of dicyandiamide. After removal of ammonia the intermediate imidazolidine-guanylimine reaction product was dissolved in isopropyl alcohol and treated with ethylene oxide. The ethylene oxide was bubbled slowly into the alcohol solution for a little over 3 hours. An increase in temperature of the reaction mixture was noted during the course of ethylene oxide addition. After the ethylene oxide addition was completed and the mixture had cooled, the alcohol was distilled and a final product obtained. This product had a mol wt. of 187, indicating that approximately 1 mol of ethylene oxide had been added thereto. This product is identified as Inhibitor No. 3 in the Table 1 which follows.

The effectiveness of my new compounds in reducing corrosion in gas and oil well production, collection, distribution and storage equipment, as well as metal surfaces exposed to other corrosive fluids, may be more fully understood by reference to certain tests which I have conducted, using an acidic brine which substantially duplicates well conditions. From one point of view the test is more stringent than actual conditions faced in field operations, since a 15% higher hydrochloric acid solution is used. This test, known as the hot hydrochloric acid test, is conducted at a temperature of 200° F. with a 15% hydrochloric acid solution.

The test procedure involved a measurement of the corrosive action of the hypothetical well fluid or brine as inhibited with the new compounds described above upon weighed, cleaned and polished strips of No. 18 gauge cold rolled steel measuring ¼" x 4", under conditions more stringent than exist in a producting well, and a comparison of the results obtained with the results obtained by subjecting identical weighed strips to the corrosive action of the hypothetical brine without inhibitor added.

As a standard of comparison, a widely used commercial inhibitor, identified hereafter as Commercial A, was used. In carrying out the test, 100 ml. of the corrosive medium was placed in an open flask and maintained at a temperature of 200° F. for one hour. A small amount of the particular inhibitor being tested was placed in the beaker. The cleaned, weighed test strips being tested were permitted to remain in the acidic medium for 1 hour. After the 1-hour period the test strips were removed, cleaned, dried and reweighed, to determine weight loss. Tests were conducted on blank strips for comparison purposes. The change in weight of the test strip, resulting from the action of the corrosive fluid thereon was taken as a measure of the inhibitor being used.

A percentage protection afforded by the respective compounds being tested may be calculated for each inhibitor in accordance with the following formula:

$$\frac{L1-L2}{L1} \times 100 = \text{percent protection}$$

in which L1 is the loss in weight of the strips taken from the uninhibited test, and L2 is the loss in weight of the strips taken from the inhibited test.

Since it is important that the test strips be free of contaminants, cleaning of the strips is an important feature of this test. Normally in cleaning, the test strip, after contact with the corrosive fluid either with or without inhibitor, is washed in kerosene, then in methanol, and finally washed with water prior to acid cleaning. The acid cleaning consists of treating the test strip in a 1 weight percent hydrochloric acid solution for a few seconds, washing with water, and thoroughly wiping with cheesecloth. The acid treatment is repeated several times until the original luster of the test strip is obtained as nearly as possible with a minimum amount of acid treating. After acid treating was completed, the strips were again washed in methanol, followed by acetone, and were then reweighed to determine the weight loss. The effectiveness of the described test method in comparing the percent protection of various inhibitors will be apparent from Table 1 which follows, in which comparative results are recorded in terms of percent protection for 250, 500 and 1000 p. p. m. of the respective inhibitors listed therein.

The results of tests conducted with the new inhibitors of my invention appear in Table 1.

Table 1

| Inhibitor No. | Formulation | Percent Protection | | |
|---|---|---|---|---|
| | | 250 p. p. m. | 500 p. p. m. | 1,000 p. p. m. |
| 1 | Diethylene triamine, Dicyandiamide Ethylene oxide 1:1:1. | 73.8 | 92.4 | 98.6 |
| 2 | Triethylene tetramine, Dicyandiamide Ethylene oxide 1:1:1. | 79.8 | 98.3 | 99.8 |
| 3 | Tetraethylene pentamine, Dicyandiamide Ethylene oxide 1:1:1. | 80.7 | 98.0 | 99.6 |
| Commercial A | | 70.2 | 91.0 | 98.1 |

It will be evident from the foregoing table that corrosion may be reduced to a value of 1/10 or less of that due to the natural flow of corrosive fluids through well tubing and pipe lines, by introducing into the system a comparatively small amount of the improved compounds of my invention.

While the tests were conducted with amounts of inhibitor varying from 250 to 1000 p. p. m., more or less inhibitor may be used in field operations, depending on the corrosivity of the fluid present in the well or pipe lines. In field use, the concentration of the inhibitor must, of course, be adjusted to the particular conditions found. Inhibitors of my invention are used in amounts of from about 100 to 1500 p. p. m., and preferably not more than about 1000 p. p. m.

I have found that excellent results are obtained by dissolving these inhibitors in an appropriate amount of water, or other inert solvent, in order to better control the amount of inhibitor used. The solution of inhibitor is then injected into the well or into transfer lines as near the well head as possible. The gas or oil flowing through the lines is then effective to mix the inhibitor with the corrosive fluids present, sweeping the same throughout the system and thereby providing protection for all the metal equipment with which it comes in contact after the point of injection.

It is to be understood that the improved compositions of my invention are not limited to use alone, and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. As a new composition of matter, a compound having the formula

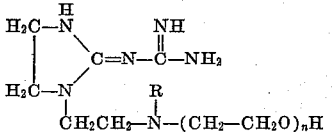

wherein R is selected from the group consisting of H, —$CH_2CH_2NH_2$, —$CH_2CH_2NHCH_2CH_2NH_2$, an alkyl group having from 1 to 10 carbon atoms, and $n$ is a whole number not exceeding 2.

2. A new composition of matter as claimed in claim 1, wherein R is H.

3. A new composition of matter as claimed in claim 1, wherein R is —$CH_2CH_2NH_2$.

4. A new composition of matter as claimed in claim 1, wherein R is —$CH_2CH_2NHCH_2CH_2NH_2$.

5. The method of controlling corrosion of metal exposed to corrosive fluid which comprises introducing into the corrosive fluid a quantity small but sufficient to substantially inhibit corrosion of a compound having the formula

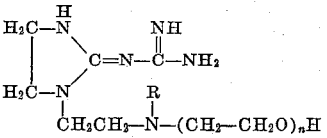

wherein R is selected from the group consisting of H, —$CH_2CH_2NH_2$, —$CH_2CH_2NHCH_2CH_2NH_2$, an alkyl group having from 1 to 10 carbon atoms, and $n$ is a whole number not exceeding 2, and passing the compound in contact with the metal surface to be protected.

6. The method of controlling corrosion of metal as claimed in claim 5, wherein R is H.

7. The method of controlling corrosion of metal as claimed in claim 5, wherein R is —$CH_2CH_2NH_2$.

8. The method of controlling corrosion of metal as claimed in claim 5, wherein R is

—$CH_2CH_2NHCH_2CH_2NH_2$

References Cited in the file of this patent

UNITED STATES PATENTS

| 2,643,227 | Hughes | June 23, 1953 |
| 2,643,978 | Hughes | June 30, 1953 |